(12) United States Patent
Munn

(10) Patent No.: US 9,853,768 B2
(45) Date of Patent: Dec. 26, 2017

(54) SYSTEM AND METHOD OF DATA COMMUNICATION THAT COMPENSATES FOR WIRE CHARACTERISTICS

(71) Applicant: UTC Fire & Security Corporation, Farmington, CT (US)

(72) Inventor: Donald J. Munn, Cortez, FL (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/141,434

(22) Filed: Apr. 28, 2016

(65) Prior Publication Data

US 2016/0323125 A1  Nov. 3, 2016

Related U.S. Application Data

(60) Provisional application No. 62/154,516, filed on Apr. 29, 2015.

(51) Int. Cl.

| | |
|---|---|
| *H04L 25/12* | (2006.01) |
| *H04L 1/00* | (2006.01) |
| *H04L 7/04* | (2006.01) |
| *H04L 7/06* | (2006.01) |
| *H04L 25/02* | (2006.01) |
| *H04L 25/03* | (2006.01) |

(52) U.S. Cl.
CPC ............ *H04L 1/0035* (2013.01); *H04L 7/042* (2013.01); *H04L 7/06* (2013.01); *H04L 25/0288* (2013.01); *H04L 25/03343* (2013.01); *H04L 25/03878* (2013.01)

(58) Field of Classification Search
CPC ..... H04L 7/06; H04L 7/042; H04L 25/03878; H04L 25/0288; H04L 25/0286; H04B 3/04

See application file for complete search history.

(56) References Cited

U.S. PATENT DOCUMENTS

| | | |
|---|---|---|
| 6,005,873 A | 12/1999 | Amit |
| 6,212,229 B1 | 4/2001 | Salinger |
| 6,236,664 B1 | 5/2001 | Erreygers |
| 6,430,199 B1 | 8/2002 | Kerpez |

(Continued)

OTHER PUBLICATIONS

Barton, M. and Honig, M., "Spectral Optimization of Discrete Multitone System on Twisted Wire Copper Pairs", Bellcore, Morristown, NJ, USA, Jun. 18-22, 1995, 6pages.

(Continued)

*Primary Examiner* — Aristocratis Fotakis
(74) *Attorney, Agent, or Firm* — Cantor Colburn LLP

(57) ABSTRACT

A system for compensating wire characteristics includes a transmission pre-emphasis module of a transmission transceiver that sends high level pre-emphasis training bits and low level pre-emphasis training bits along a wired connection, a reception pre-emphasis module of a receiver that receives the high level pre-emphasis training bits and low level pre-emphasis training bits along the wired connection, a pre-emphasis analysis module of the receiver that analyzes the high level pre-emphasis training bits and low level pre-emphasis training bits to determine a pre-emphasis level. The system further includes a controller that interfaces with the transmission transceiver and the receiver, the controller communicates the pre-emphasis level to the transmission transceiver.

14 Claims, 7 Drawing Sheets

(56) References Cited

U.S. PATENT DOCUMENTS

| | | |
|---|---|---|
| 6,445,712 B1 | 9/2002 | Cooperman et al. |
| 6,480,559 B1 * | 11/2002 | Dabak ............... H04L 7/042 370/514 |
| 6,493,875 B1 | 12/2002 | Eames et al. |
| 6,516,025 B1 | 2/2003 | Warke et al. |
| 6,714,545 B1 | 3/2004 | Hugenberg et al. |
| 6,898,280 B1 | 5/2005 | Dombkowski et al. |
| 6,925,090 B2 | 8/2005 | Inada et al. |
| 7,076,514 B2 | 7/2006 | Erdogan et al. |
| 7,136,397 B2 | 11/2006 | Sharma |
| 7,190,722 B2 | 3/2007 | Lakkis et al. |
| 7,327,814 B1 | 2/2008 | Xu |
| 7,352,805 B2 | 4/2008 | Langberg et al. |
| 7,426,235 B1 | 9/2008 | Anderson et al. |
| 7,436,849 B1 | 10/2008 | Amrany et al. |
| 7,486,742 B2 | 2/2009 | Santhoff et al. |
| 7,929,596 B2 | 4/2011 | Lakkis |
| 8,023,642 B2 | 9/2011 | Miller et al. |
| 8,396,105 B2 | 3/2013 | Gerfers et al. |
| 8,588,289 B2 | 11/2013 | Rane et al. |
| 8,660,206 B2 | 2/2014 | Kohno |
| 8,699,585 B2 | 4/2014 | Okamura |
| 8,749,285 B1 * | 6/2014 | Choy ............... H04L 25/0272 327/161 |
| 2003/0090738 A1 | 5/2003 | Ananthaiyer et al. |
| 2004/0114676 A1 | 6/2004 | Dasgupta et al. |
| 2006/0204245 A1 | 9/2006 | Tanabe |
| 2006/0280260 A1 * | 12/2006 | Dally ............... H04L 25/03343 375/296 |
| 2008/0080609 A1 * | 4/2008 | Mobin ............... H04L 25/03057 375/233 |
| 2009/0290651 A1 * | 11/2009 | Okamura ............... H04L 1/205 375/257 |
| 2012/0207202 A1 * | 8/2012 | Hidaka ............... H04L 25/03076 375/233 |
| 2013/0089122 A1 * | 4/2013 | Lin ............... H04L 25/0264 375/219 |
| 2013/0241643 A1 | 9/2013 | Xu et al. |
| 2016/0241422 A1 * | 8/2016 | Akita ............... H04B 3/10 |

OTHER PUBLICATIONS

Darshan, N. and Rosenhouse, I. "Nonlinear Pre-emphasis for Improving QAM Performance Over Channels with Additive and Multiplicative Noise", Ceragon Networks Ltd. (CRNT), Tel Aviv, Israel Nov. 17-20, 2010, 5pages.

Great Britain Office Action for appln. GB1607389.2, dated Dec. 7, 2016, 6 pages.

* cited by examiner

SYSTEM AND METHOD OF DATA COMMUNICATION THAT COMPENSATES FOR WIRE CHARACTERISTICS

CROSS REFERENCE TO RELATED APPLICATION

This application claims the benefit of an earlier filing date from U.S. Provisional Application Ser. No. 62/154,516 filed Apr. 29, 2015, the entire disclosure of which is incorporated herein by reference.

FIELD OF THE PRESENT DISCLOSURE

The subject matter disclosed herein relates to wired transmission systems, and in particular to a fire control system with a panel for transmitting signals over at least one wired connection.

BACKGROUND

Legacy fire control systems use wired communications channels designed for low-frequency operations, while modern systems use high frequency communications. The transmission of high frequency data on wired communications channels of legacy systems can introduce unwanted capacitance in the channels. Capacitance in the legacy twisted pair wire limits the frequency of data transmission. The unwanted capacitance distorts transmitted data, resulting in unacceptable bit error rates, which is not acceptable in control systems that require high reliability. Moreover, replacement of wiring in a structure can introduce significant cost.

BRIEF DESCRIPTION OF THE PRESENT DISCLOSURE

According to an exemplary embodiment of the present disclosure, a system for compensating for wire characteristics includes a training sequence module of a transmission transceiver that sends high amplitude pre-emphasis training bits and low amplitude pre-emphasis training bits along a wired connection; a reception pre-emphasis analysis module of a receiver that receives the high amplitude pre-emphasis training bits and low amplitude pre-emphasis training bits along the wired connection; a pre-emphasis analysis module of the receiver that analyzes the high amplitude pre-emphasis training bits and low amplitude pre-emphasis training bits to determine a pre-emphasis level; and a controller that interfaces with the transmission transceiver and the receiver, wherein the controller communicates the pre-emphasis level to the transmission transceiver.

According to an exemplary embodiment of the present disclosure, a method of compensating for wire characteristics, the method comprises sending pre-emphasis training bits at a first amplitude and a second amplitude along a wired connection; receiving the pre-emphasis training bits along the wired connection; analyzing the pre-emphasis training bits to determine a pre-emphasis level; and communicating the pre-emphasis level to the transmission transceiver.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION OF THE PRESENT DISCLOSURE

Figure 1:
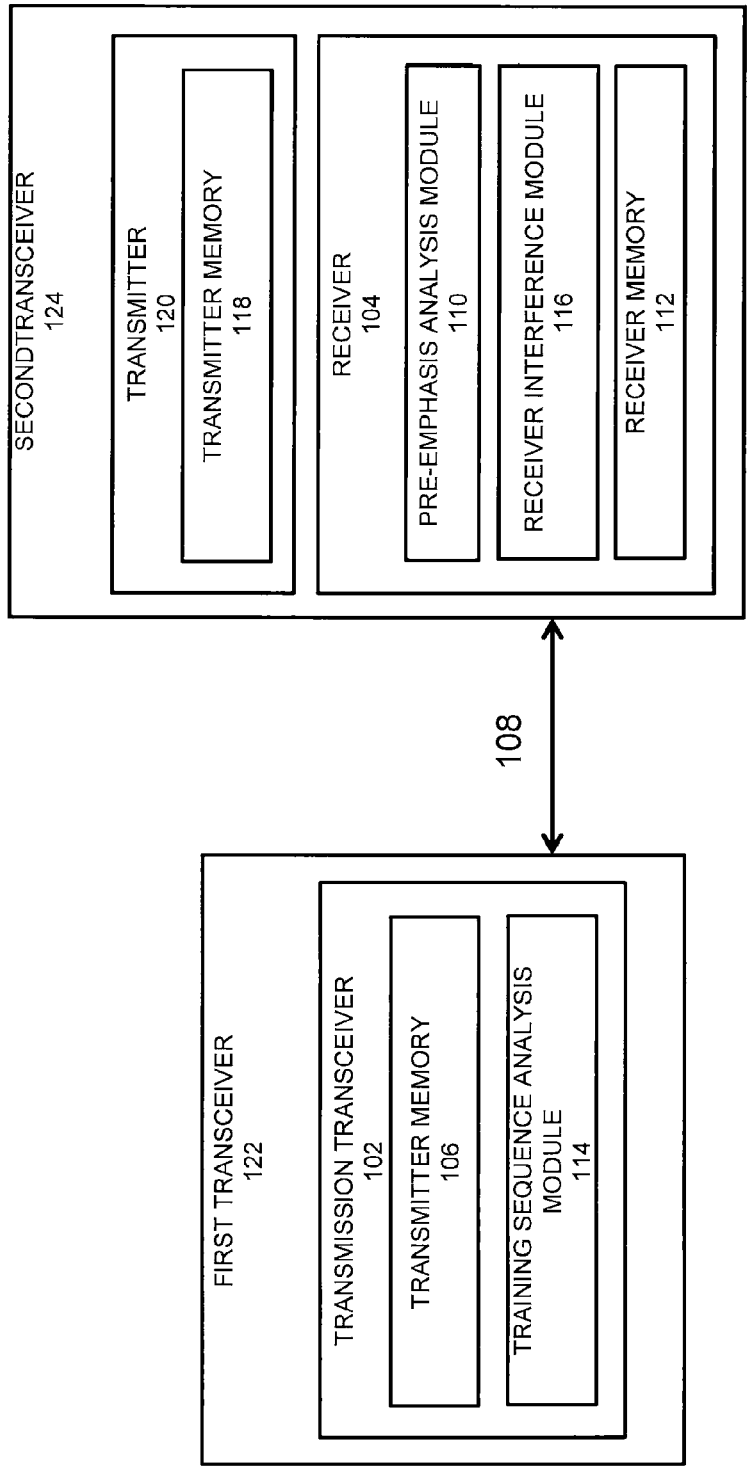
FIG. 1 is an illustration of a system for compensating wire characteristics in accordance with one embodiment of the present disclosure.

FIG. 1 is a schematic illustration of transmission transceiver 102 and a receiver 104 in accordance with one embodiment of the present disclosure. The transmission transceiver 102 is in communication with transmitter memory 106. The transmitter memory 106 can be, but is not limited to RAM, EEPROM, flash storage, etc. The transmission transceiver 102 is connected to a first end of a twisted wire pair 108. A second end of the twisted wire pair 108 opposite the first end is connected to the receiver 104. The receiver 104 is configured to communicate with receiver memory 112. Both first transceiver 122 and second transceiver 124 are identical and perform the same functions. Only the transmission from first transceiver 122 to second transceiver 124 is shown in FIG. 1.

Upon initialization, the transmission transceiver 102 accesses transmitter memory 106 to retrieve the pre-emphasis training bits for transmission. The pre-emphasis training bits include a frame sync bit series, a zero bit series, and a one bit series that include strings of one bits, zero bits, and frame sync bits. A first transmission of the pre-emphasis training bits takes place a high amplitude that is determined by the transmission transceiver 102. The pre-emphasis training bits are specifically designed to test the transmission properties of the twisted wire pair 108 and can change based on the properties of the twisted wire pair 108 carrying the pre-emphasis training bits. During transmission, each bit of the pre-emphasis training bits is represented by a half-period of a sinusoidal waveform, for example.

In one embodiment, the pre-emphasis training bits comprise different bit types including logic one, logic zero, and frame sync. In one embodiment, the logic one bit is represented by the shortest time between zero crossings of the sinusoidal waveform, the frame sync bit is represented by the longest time between zero crossings of the sinusoidal waveform, and the logic zero bit is represented by a time that falls between the time between zero crossings of the logic one bit and the frame sync bit. A logic one bit is the highest frequency bit, and therefore is attenuated more during transmission than a logic zero bit or a frame sync bit. The period of the half-cycle, as read by the receiver 104, determines the specific bit that is sent and received.

For example, a logic one bit may be represented by a sinusoidal half-cycle period of 0.9 μsec, a logic zero bit is represented by a half-cycle period of 1.1 μsec, and a frame sync bit is represented by a period of 1.3 μsec in one embodiment.

The transmission transceiver 102 transmits the pre-emphasis training bits along the twisted wire pair 108 as a varying sinusoidal waveform representing a sequence of one bits, zero bits, and frame sync bits at the first high amplitude. The receiver 104 includes a pre-emphasis analysis module 110. The pre-emphasis analysis module 110 determines the pre-emphasis level for the frame sync bit series by analyzing the relative amplitude of the received pre-emphasis training bits.

For example, if the pre-emphasis analysis module 110 determines that zero bit series, the one bit series and frame sync series appear to be saturated, (i.e. the relative amplitudes are approximately equal), the pre-emphasis analysis module 110 determines that a second amplitude, that is less than the first amplitude, is to be used by the receiver. Thus, the pre-emphasis module analyzes the pre-emphasis training bits based at least in part on a saturation level of the frame sync bit series, the zero bit series, and the one bit series.

If the pre-emphasis analysis module 110 of the receiver 104 determines that the pre-emphasis training bits are saturated, the pre-emphasis analysis module 110 analyzes a second series of pre-emphasis training bits. The second series of pre-emphasis training bits are sent at the second amplitude that is less than the first amplitude, to avoid saturation of the pre-emphasis training bits as received by the receiver 104. The second series of pre-emphasis training bits includes a frame sync bit series, a zero bit series, and a one bit series transmitted at the second amplitude. The second amplitude is less than the first amplitude, and the second amplitude does not saturate the pre-emphasis training bits. The relative amplitudes of the frame sync bit series, a zero bit series, and a one bit series can vary.

After the transmission of the pre-emphasis training bits are completed, the relative amplitudes of logic one bits are measured and compared to a threshold value stored in receiver memory 112. If the logic one bits, as received by the receiver 104 are above or equal to a threshold, receiver 104 populates a lookup table in the transmitter memory 118 based on a standard waveform. If the relative amplitudes of the logic one bits indicate a logic one are below a threshold, a derivative waveform of the one bits, the zero bits and the frame sync bits are used to populate the lookup table in transmitter memory 118.

After determining whether to use a standard waveform or a derivative waveform, the pre-emphasis analysis module 110 calculates additional attenuation factors for the zero bits and frame sync bits. The pre-emphasis analysis module 110 then multiplies the zero bit frequency and frame sync waveform lookup tables times the scaling factor to determine a pre-emphasis level. The receiver then stores these values including a pre-emphasis level in calculated look-up tables in transmitter memory 118. The calculated look-up tables are used by the transmitter 120 to transmit the training bits, and to later use for data transmissions to transceiver 122.

In any case, if the pre-emphasis analysis module 110 determines that a saturation does not occur at the first amplitude, the pre-emphasis analysis module 110 instructs the receiver interference module 116 to apply the first amplitude to a training sequence, as described in more detail below. If the pre-emphasis analysis module 110 determines that a saturation does occur at the first amplitude, the pre-emphasis analysis module 110 instructs the receiver interference module 116 to apply the second amplitude to the training sequence, as described in more detail below.

Based on the determination of whether to use a first amplitude or a second amplitude by the pre-emphasis analysis module 110, the receiver interference module 116 of the receiver 104 applies the pre-emphasis level to a training sequence. The training sequence includes a training one bit preceded by incremented combinations of three successive bits. The training sequence further includes and a training zero bit preceded by incremented combinations of three successive bits. The training one bit and the training zero bit have the same half-cycle periods as the one bit and zero bit, as described above.

For example, a training sequence may comprise a first zero bit, a second zero bit, a third zero bit, and a training zero bit. The training sequence may further comprise a first zero bit, a second zero bit, a third zero bit, and a training one bit. The first three bits of a training sequence may be incremented by one bit. Thus, the incremented training sequence may comprise a first zero bit, a second zero bit, a first one bit, and a training zero bit. The incremented training sequence may further comprise a first zero bit, a second zero bit, a first one bit, and a training one bit. The training sequence may be incremented by until the first three bits of the sequence are one bits. Each increment of the training sequence is transmitted along the twisted wire pair 108.

A training sequence analysis module 114 of the transmission transceiver 102 measures a one bit period of a training one bit for each combination of the three successive bits that precede the training one bit. The training sequence analysis module 114 stores the period of each training one bit in a lookup table for each incremented training sequence. The transmitter memory 106 stores the lookup table in one embodiment.

The training sequence analysis module 114 also measures a zero bit period of a training zero bit for each combination of the three successive bits that precede the training zero bit. The training sequence analysis module 114 stores the period of each training zero bit in a lookup table, for each incremented training sequence. The training sequence analysis module 114 then computes an average value of the one bit period and the zero bit period for each incremented combination of the preceding three successive bits that precede the training one bit and training zero bit. The average value is stored in the lookup table in the transmitter memory 106, in one embodiment. The average value can be used by the transmission transceiver 102 to differentiate between a one-bit and a zero bit based on the known transmission properties of the twisted wire pair 108.

For example, receiver 104 can set a threshold value from the average value period value of each incremented training sequence. If a measured one-bit is less than the average value, the receiver 104 can determine that a one-bit is received. The interference of the previously-received bits can be taken into account, to determine whether a one-bit value or a zero-bit value is received.

Figure 2:
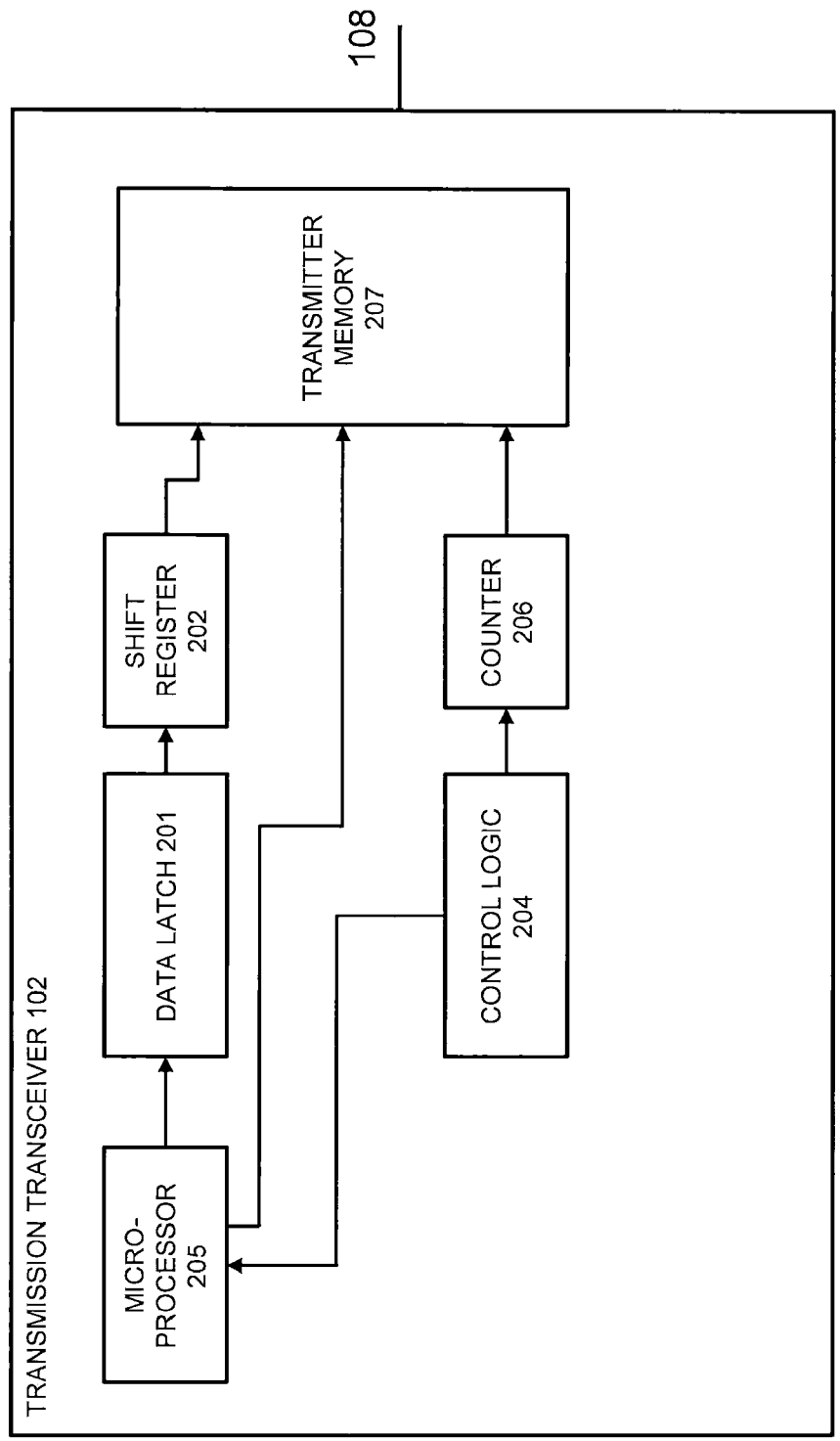
FIG. 2 is a block diagram of a transmission transceiver 102 in accordance with one embodiment of the subject present disclosure.

Turning now to FIG. 2, a transmission transceiver 102 in accordance with one or more embodiments is shown. The transmission transceiver 102 includes a transmitter memory 207 that may contain look-up tables for generating ones, zeros, and frame sync bits for example. Although each bit is a half cycle of a sinusoidal waveform, different waveforms are required for ones, zeros, and frame syncs so that pre-emphasis may be applied independently on each waveform.

The waveform lookup up tables in transmitter memory 106 are populated after a twisted pair training session.

During the twisted pair training session, the pre-emphasis training bits, consisting of a sequence of ones, zeros, and frame syncs are sent across the twisted pair. The respective amplitudes of the sequence are measured at a receiver at an opposite end of the twisted pair. A logic one is sent at a high frequency that is higher than the mid-frequency frame sync. The logic one will be attenuated more than the low frequency zero and mid-frequency frame sync.

The lookup table in transmitter memory 106 is addressed by the specific bits to be sent. For example, a logic one is represented by address 00, a logic zero is represented by 01, and a frame sync is represented by 11. Bits to be sent are loaded into the parallel to serial shift register 202 at the start of a frame. Stepping through the waveform table is accomplished by counter 206, which is reset by the control logic 204 after the current bit is sent so that the next bit may be shifted out of shift register 202 and sent. The bits to be sent are loaded into data latch 201 by the microprocessor 205.

The lookup table in transmitter memory 106 is output as a binary representation of the amplitude of a logic one, logic zero, or frame sync waveform. This binary representation is connected to an external resistor ladder, the output of which is connected to an amplifier for transmission along the twisted wire pair 108, for example.

If the twisted pair wire is short, then the pre-emphasis will be applied to the standard waveform and stored in a lookup table. If the twisted pair wires are long, the pre-emphasis is applied to the derivative of the standard waveform. The standard waveforms for a logic one, logic zero, and frame sync, and derivative of the transmit waveforms for a logic one, logic zero, and frame sync are stored in a lookup table in transmitter memory 106 in one embodiment.

Figure 3:
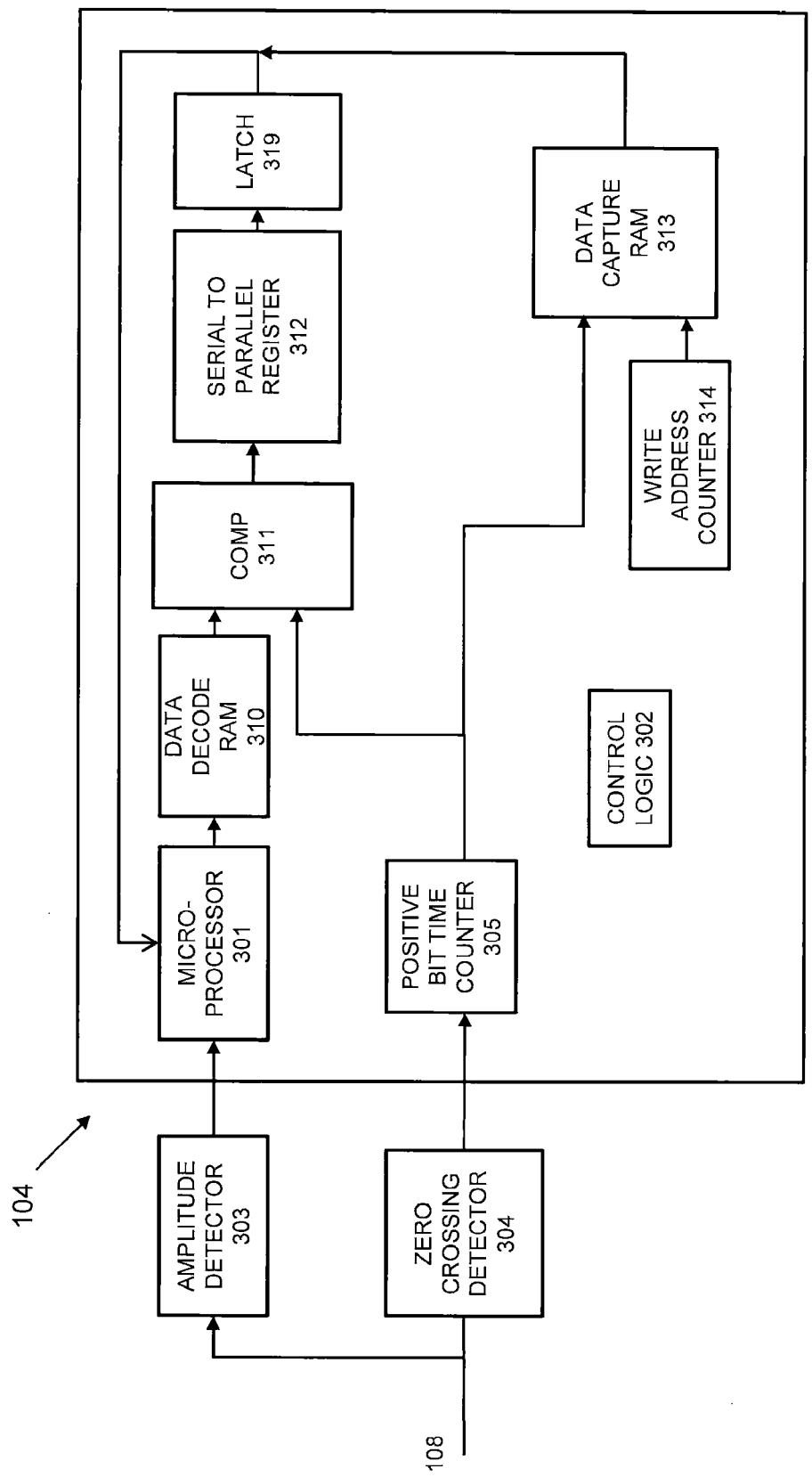
FIG. 3 is a block diagram of a receiver 104 in accordance with one embodiment of the subject present disclosure.

Whether to use the standard waveform or its derivative, and how much pre-emphasis is applied is determined by relative amplitudes of the one, zero, and frame sync frequencies sensed when the pre-emphasis training bits are received FIG. 3 is an exemplary apparatus for the receiver 104 according to one embodiment of the present disclosure. The received waveform from the twisted pair 108 is amplified and passed to a zero crossing detector 304. The zero crossing detector 304 outputs a logic one when the input passes above zero volts. The zero crossing detector outputs a logic zero when the waveform passes below zero volts.

When the output of the zero crossing detector is a logic one, the positive bit time counter 305 is started. When the output of the zero crossing detector is a logic zero, the output of the positive bit time counter 305 is output to the comparator 311, and the counter starts counting again. The comparator 311 compares the positive count to the output of the data decode ram 310.

The output of the comparator 311 is the decoded bit, either a one or zero which is shifted into the serial to parallel register 312. If a frame sync is decoded, the data in the serial to parallel register is latched and the microprocessor 301 is notified that data is ready to be read from latch 319.

The capacitance and resistance of a twisted pair wire distorts the data. Some of this distortion is a function of the influence of the previous bits sent across the wire on the current bit being sent. If the influence of the previous bits are known then this information could be used to decode the current bit. For instance if the three previous bits are known to be 000 then the count of the current bit is compared to count of the midpoint of the zero and a one preceded by three zeros. That value would have been stored in a memory, for example. If the current count is below the midpoint, then the bit is decoded as a one. During the second half of the training sequence a training bit pattern is sent across the twisted pair wire. The training bit pattern consists of all the possible bit combinations of four consecutive bits. At the receiver these bits are converted to counts. The receiver stores the incoming training bit pattern in the data capture ram 313.

After the counts associated with the training bit pattern are stored in the data capture ram 313 the microprocessor 301 reads the counts and calculates the midpoint value between a one and a zero. The midpoints are then stored in the data decode ram 310. The decode process always starts with a one, frame sync, one, followed by the first bit to be decoded. The one, frame sync, one bit sequence is used to address the midpoint value of a one and zero.

The current bit which is represented by a count at the output of bit time counter 305 is compared to the data decode ram 310 value. If the current bit count is less than the midpoint it is decoded as a one, if it is greater than the midpoint it is decoded as a zero. The current bit count is also compared to the midpoint of a zero and a frame sync. If the current count is less than the zero-frame sync midpoint the current bit is decoded as a zero, is the current bit is greater than the midpoint the current bit is decoded as a frame sync.

Figure 4:
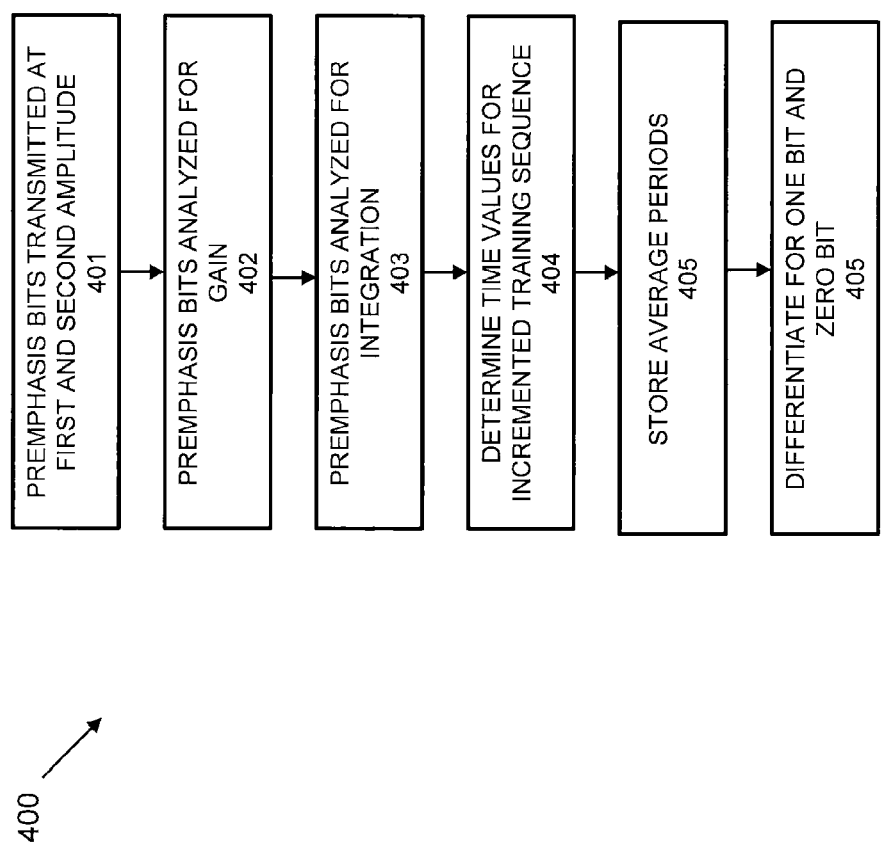
FIG. 4 is a block diagram of a method for compensating wire characteristics in accordance with one embodiment of the present disclosure.

FIG. 4 is a flow diagram depicting a method 400 according to one embodiment of the present disclosure. At step 401, a set of pre-emphasis training bits are transmitted at a first high amplitude and a second lower amplitude. The pre-emphasis training bits include a frame sync bit series, a zero bit series, and a one bit series that include strings of one bits, zero bits, and frame sync bits. At step 402, the pre-emphasis training bits are analyzed to determine whether the first amplitude or second amplitude should be applied to a training sequence. At step 403, the pre-emphasis training bits are further analyzed to determine whether the pre-emphasis bits are integrated during transmission, and whether a derivative should be applied to a training sequence and subsequent transmissions of bits at the first or second amplitude. At step 404, time values are determined for an incremented training sequence. At step 405, the average periods are stored for a one bit and a zero bit transmitted after incremented training sequence values. At step 406, the average periods can be used to differentiate between a one-bit and a zero bit based on the known transmission properties of at least one twisted wire pair.

Figure 5:
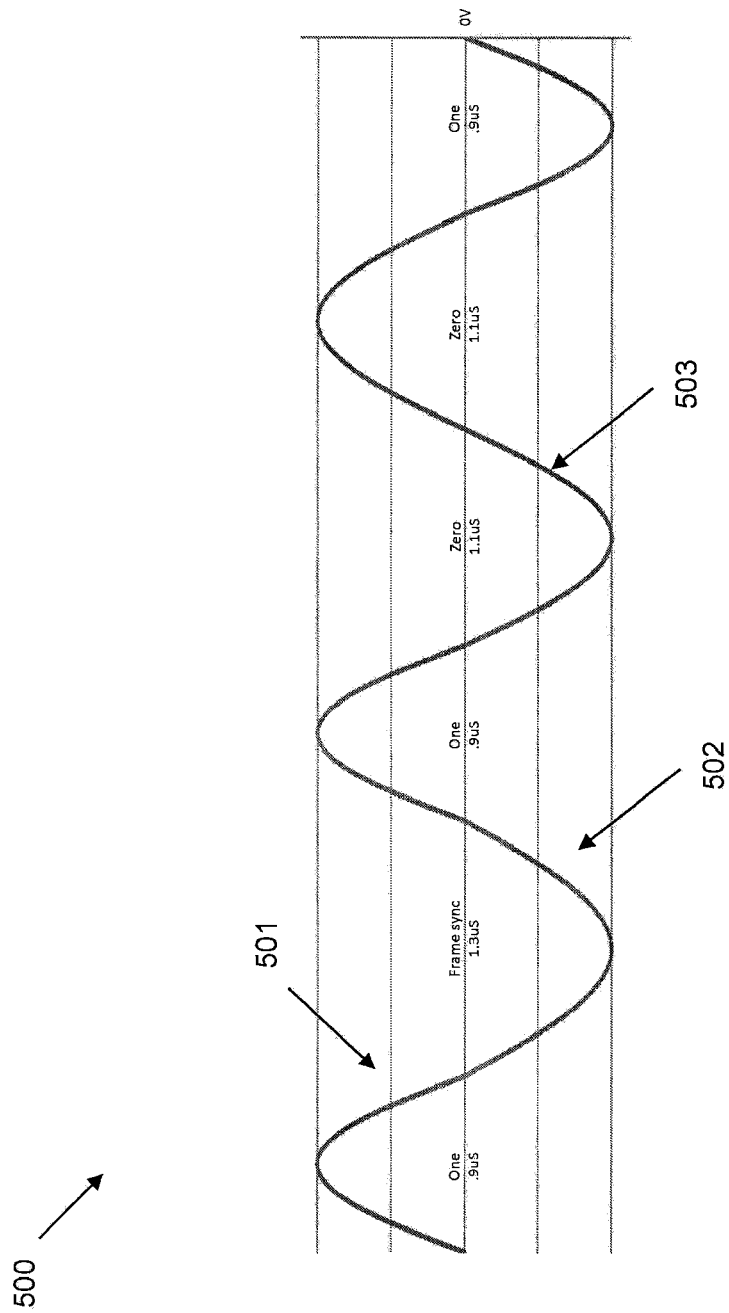
FIG. 5 is a waveform for a short twisted pair wire that introduces minimal distortion in accordance with one embodiment of the present disclosure.

FIG. 5 is an illustration of a transmission waveform 500 in accordance with one embodiment of the subject present disclosure. The transmission waveform 500 is used as the transmit waveform for short twisted pair wire runs which introduce minimal distortion. The start of each bit is represented by a transition above or below the 0V line. A one bit 501 is represented by a transition above 0V for a duration 0.9 uS. A frame sync bit 502 is represented by a transition below 0V for a duration of 1.3 uS. A zero bit 503 is represented by a transition above 0V for a time of 1.1 uS.

Figure 6:
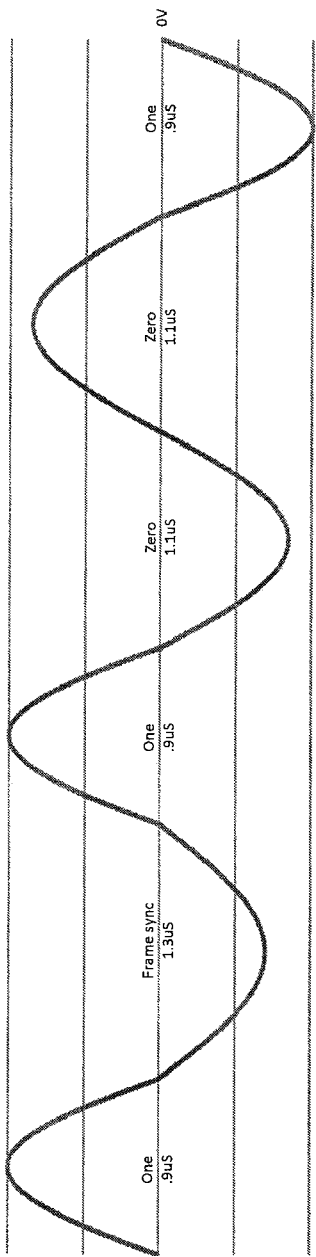
FIG. 6 is a waveform for a twisted pair wire that introduces distortion in accordance with one embodiment of the present disclosure.

FIG. 6 is an illustration of the transmit waveform used when the twisted pair wire is of medium length (500 ft-3000 ft). This waveform is a modified version of the waveform in FIG. 5. in which the higher frequency one bits are increased in amplitude relative to the zero bits and the frame sync bits. The zero bits are also amplitude adjusted so that the amplitude is less than a one bit but greater the lower frequency frame sync bit. The start of each bit is represented by a transition above or below the 0V line.

Figure 7:
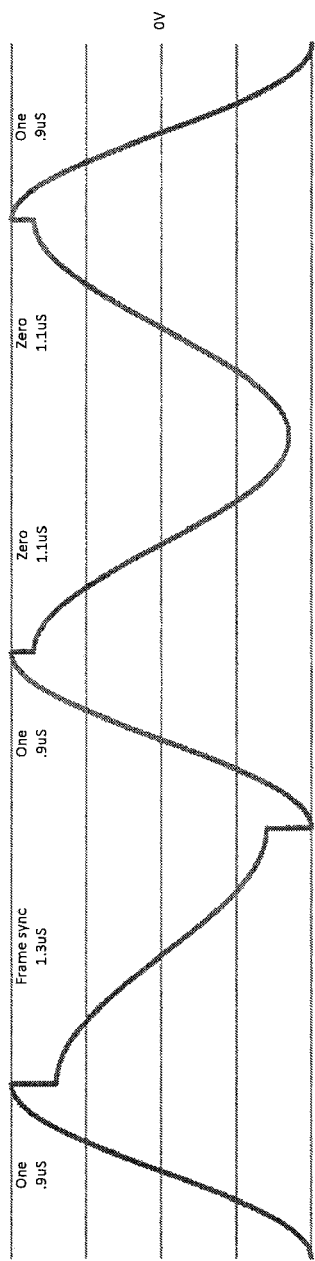
FIG. 7 is a waveform for a twisted pair wire that integrates a waveform signal in accordance with one embodiment of the present disclosure.

FIG. 7 is an illustration of the transmit waveform used when the twisted pair wire is of longer length (2500 ft-5000 ft). This waveform is a derivative of the waveform in FIG.

5. The one bits are increased in amplitude relative to the zero bit and the frame sync bit amplitudes. The zero bit is higher in amplitude than the frame sync bit but lower in amplitude than the one bits. After the twisted pair wire integrates the waveform it arrives at the receiver as shown in FIG. 5.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A system for compensating wire characteristics, the system comprising:
a transmission pre-emphasis module of a transmission transceiver that sends high amplitude pre-emphasis training bits and low amplitude pre-emphasis training bits along a wired connection;
and a receiver that receives the high amplitude pre-emphasis training bits and low amplitude pre-emphasis training bits along the wired connection; the receiving comprising:
a pre-emphasis analysis module of the receiver that analyzes the high amplitude pre-emphasis training bits and low amplitude pre-emphasis training bits to determine a pre-emphasis level; and
a controller that interfaces with the transmission transceiver and the receiver, the controller communicating the pre-emphasis level to the transmission transceiver.

2. The system of claim 1, wherein at least one of the high amplitude pre-emphasis training bits and the low amplitude pre-emphasis training bits include a frame sync bit series, a zero bit series, and a one bit series.

3. The system of claim 2, wherein the frame sync bit series includes a frame sync bit, the frame sync bit is represented by a half cycle of a sine wave, the half cycle having a time of approximately 1.3 microseconds.

4. The system of claim 3, wherein the zero bit series includes a zero bit, the zero bit is represented by a half cycle of a sine wave, and the half cycle has a time of approximately 1.1 microseconds.

5. The system of claim 4, wherein the one bit series includes a one bit, the one bit is represented by a half cycle of a sine wave, and the half cycle has a time of approximately 0.9 microseconds.

6. The system of claim 2, wherein the pre-emphasis analysis module determines the pre-emphasis level for the frame sync bit series, the zero bit series, and the one bit series based at least in part on a saturation level of the frame sync bit series, the zero bit series, and the one bit series.

7. The system of claim 1, wherein the pre-emphasis level is applied to a training sequence, the training sequence includes a training one bit preceded by incremented combinations of three successive bits, and the training sequence further includes a training zero bit preceded by incremented combinations of three successive bits.

8. The system of claim 7, further comprising a midpoint analysis module that measures a one bit period of a training one bit for each combination of the three successive bits, measures a zero bit period of a training zero bit for each combination of the three successive bits, computes an average value of the one bit period and the zero bit period, and stores the average value to differentiate between a one-bit and a zero bit.

9. The system of claim 1, wherein the high amplitude pre-emphasis training bits are transmitted at a first amplitude.

10. The system of claim 9, wherein the low amplitude pre-emphasis training bits are transmitted at a second amplitude, and wherein the second amplitude is less than the first amplitude.

11. A method of compensating for wire characteristics, the method comprising:
sending pre-emphasis training bits along a wired connection;
receiving the pre-emphasis training bits along the wired connection;
analyzing the pre-emphasis training bits to determine a pre-emphasis level; and
communicating the pre-emphasis level to a transmission transceiver;
wherein the pre-emphasis training bits include a frame sync bit series, a zero bit series and a one bit series;
wherein the frame sync bit series includes a frame sync bit, the frame sync bit is represented by a half cycle of a sine wave having a first duration;
wherein the zero bit series includes a zero bit, the zero bit is represented by a half cycle of a sine wave having a second duration;
wherein the one bit series includes a one bit, the one bit is represented by a half cycle of a sine wave having a third duration;
wherein at least two of the first duration, second duration and third duration are not equal.

12. The method of claim 11, wherein the first duration, second duration and third duration are not equal.

13. The method of claim 11, wherein the first duration is greater than the second duration.

14. The method of claim 13, wherein the second duration is greater than the third duration.

* * * * *